United States Patent
Ha et al.

(10) Patent No.: US 9,116,386 B2
(45) Date of Patent: Aug. 25, 2015

(54) LENS, BACKLIGHT ASSEMBLY AND DISPLAY APPARATUS HAVING THE SAME

(71) Applicant: SAMSUNG DISPLAY CO., LTD., Yongin, Gyeonggi-Do (KR)

(72) Inventors: Ju-Hwa Ha, Asan-si (KR); Joong-Hyun Kim, Asan-si (KR); Jin Seo, Osan-si (KR); Ju-Youn Son, Asan-si (KR); Dong-Min Yeo, Asan-si (KR); Sang-Heon Ye, Cheonan-si (KR); Young-Keun Lee, Cheonan-si (KR); Ji-Won Lee, Daejeon (KR)

(73) Assignee: SAMSUNG DISPLAY CO., LTD. (KR)

( * ) Notice: Subject to any disclaimer, the term of this patent is extended or adjusted under 35 U.S.C. 154(b) by 206 days.

(21) Appl. No.: 13/658,142

(22) Filed: Oct. 23, 2012

(65) Prior Publication Data
US 2013/0148333 A1   Jun. 13, 2013

(30) Foreign Application Priority Data
Dec. 12, 2011   (KR) .................. 10-2011-0132850

(51) Int. Cl.
| | |
|---|---|
| G09F 13/04 | (2006.01) |
| G09F 13/08 | (2006.01) |
| G02F 1/1335 | (2006.01) |
| G02B 19/00 | (2006.01) |

(Continued)

(52) U.S. Cl.
CPC ........ *G02F 1/133603* (2013.01); *G02B 5/0263* (2013.01); *G02B 19/0009* (2013.01); *G02B 19/0061* (2013.01); *F21V 5/046* (2013.01); *G02F 2001/133607* (2013.01)

(58) Field of Classification Search
CPC ............ F21V 5/04; F21V 5/08; F21V 7/0091
USPC ........... 362/335, 97.1, 245, 309, 555, 296.01, 362/311.01, 311.1, 311.06, 311.08; 359/718, 709; 349/62, 64, 65, 67
See application file for complete search history.

(56) References Cited

U.S. PATENT DOCUMENTS

| | | | |
|---|---|---|---|
| 7,352,011 B2 | 4/2008 | Smits et al. | |
| 8,833,979 B2* | 9/2014 | Wang et al. | 362/311.01 |
| 2002/0085390 A1* | 7/2002 | Kiyomoto et al. | 362/555 |

(Continued)

FOREIGN PATENT DOCUMENTS

| | | |
|---|---|---|
| CN | 201836765 U | 5/2011 |
| JP | 2011034770 A | 2/2011 |

(Continued)

OTHER PUBLICATIONS

European Patent Office Action dated Feb. 4, 2014 for corresponding European Patent Application No. 12189348.1-1553, 6 pages.

(Continued)

*Primary Examiner* — Thomas A Hollweg
*Assistant Examiner* — Kevin Quarterman
(74) *Attorney, Agent, or Firm* — Cantor Colburn LLP (57) ABSTRACT

A lens includes an upper flat surface having a first outer diameter, a bottom surface having a second outer diameter and a third inner diameter, an external curved surface which connects the upper flat surface and the bottom surface, and an inner curved surface which protrudes toward the upper flat surface from the bottom surface at the third inner diameter.

19 Claims, 6 Drawing Sheets (51) Int. Cl.
*G02B 5/02* (2006.01)
*F21V 5/04* (2006.01)

(56) References Cited

U.S. PATENT DOCUMENTS

| | | | |
|---|---|---|---|
| 2009/0052192 A1 | 2/2009 | Kokubo et al. | |
| 2010/0046202 A1* | 2/2010 | Joo et al. | 362/97.1 |
| 2010/0073927 A1* | 3/2010 | Lewin et al. | 362/240 |
| 2010/0220485 A1* | 9/2010 | Kim et al. | 362/309 |
| 2011/0051044 A1 | 3/2011 | Segawa | |
| 2011/0116272 A1* | 5/2011 | Bak et al. | 362/296.01 |
| 2011/0242846 A1 | 10/2011 | Park | |
| 2012/0268950 A1* | 10/2012 | Parkyn et al. | 362/335 |
| 2012/0300456 A1* | 11/2012 | Phillips et al. | 362/245 |
| 2013/0013252 A1* | 1/2013 | Ono et al. | 702/167 |

FOREIGN PATENT DOCUMENTS

| | | |
|---|---|---|
| KR | 100972135 B1 | 7/2010 |
| KR | 1020110029866 A | 3/2011 |

OTHER PUBLICATIONS

The Extended European Search Report for European patent application No. 12189348.1 mailing date of Feb. 7, 2013.
The Extended European Search Report for European Patent Application No. 14171348.7 dated Aug. 26, 2014.

* cited by examiner

LENS, BACKLIGHT ASSEMBLY AND DISPLAY APPARATUS HAVING THE SAME

This application claims priority to Korean Patent Application No. 10-2011-0132850, filed on Dec. 12, 2011, and all the benefits accruing therefrom under 35 U.S.C. §119, the contents of which are herein incorporated by reference in its entirety.

BACKGROUND OF THE INVENTION

1. Field of the Invention

Exemplary embodiments of the invention relate to a lens, a backlight assembly and a display apparatus having the lens. More particularly, exemplary embodiments of the invention relate to a lens, a backlight assembly and a display apparatus having the lens, with respect to fewer light sources.

2. Description of the Related Art

A liquid crystal display ("LCD") apparatus needs an external light source for displaying an image with desirable brightness since the LCD apparatus cannot generate light by itself. The LCD apparatus includes a backlight assembly as the external light source, and a LCD display panel which displays the image using light from the external light source.

The backlight assembly includes a light source which may be mounted on a printed circuit board ("PCB") substrate, and may be classified into an edge type assembly and a direct type assembly according to the position of the light source. In the edge type assembly, the light source is disposed at the edge of the LCD display panel, such that the light generated by the light source passes through a light guide plate, which is disposed under the LCD display panel, and is provided into the LCD display panel. In the direct type assembly, a plurality of light sources is disposed under the LCD display panel and the light generated by the light sources is provided directly into the LCD display panel. The direct type assembly might have higher brightness and better contrast ratio than the edge type assembly.

A cold cathode fluorescent lamp ("CCFL") may be used for the light source of the direct type assembly. As a light source, a light emitting diode ("LED") lamp may be used owing to advantages of a long life-time, lower power consumption, a light weight and a smaller thickness.

The LED lamp includes a point light source and a plurality of LED packages generating light. The LED package distributes light generated and emitted by the point light source. The point light from the point light source is changed into a planar light or surface light by a lens.

However, the point light source of the LED lamp has a small light distribution area for each point light source and a limited brightness. Thus, the backlight assembly may include hundreds of point light sources and/or LED lamps. As the number of the point light sources and/or LED lamps is increased, the number of the PCB and/or a size of the PCB is increased. Thus, the manufacturing cost of the LCD display apparatus is greatly increased.

BRIEF SUMMARY OF THE INVENTION

One or more exemplary embodiments of the invention provide a lens using fewer light sources.

One or more exemplary embodiments of the invention also provide a backlight assembly including the lens.

One or more exemplary embodiments of the invention also provide a display apparatus including the lens.

According to an exemplary embodiment of the invention, a lens includes an upper flat surface having a first outer diameter, a bottom surface having a second outer diameter and a third inner diameter, an external curved surface which connects the upper flat surface and the bottom surface, and an inner curved surface which protrudes toward the upper flat surface from the bottom surface, at the third inner diameter.

In an exemplary embodiment, the second outer diameter may be about six times the first outer diameter.

In an exemplary embodiment, the inner curved surface may include a half-ellipse shape in a cross-sectional view taken perpendicular to the upper flat surface.

In an exemplary embodiment, a ratio of a diameter B to a diameter A may be about 1.5 to about 2.0. The diameter A is defined as half a maximum length of the half-ellipse shape taken parallel to the upper flat surface, and the diameter B is a maximum length of the half-ellipse shape taken perpendicular to the upper flat surface, in the cross-sectional view.

In an exemplary embodiment, an angle between the bottom surface and the inner curved surface may be about 105 degrees to about 115 degrees.

In an exemplary embodiment, the bottom surface may include an embossed pattern having a roughness less than about 4 micrometers.

In an exemplary embodiment, the first outer diameter may be more than two times the third inner diameter.

In an exemplary embodiment, the lens may further include an alignment protrusion which protrudes from the bottom surface and away from the upper flat surface.

In an exemplary embodiment, the lens may further include two lens combining parts which are extended from a side of the lens where the bottom surface and the external curved surface meet.

In an exemplary embodiment, a light which is emitted from the external curved surface may include a light orientation angle distribution of about 65 degrees to about 75 degrees.

In an exemplary embodiment, a light which is emitted from from the external curved surface may include an intensity band width of less than about 20 degrees.

In an exemplary embodiment, a ratio of a center intensity to a peak intensity of a light which is emitted from the external curved surface may be about 0.15.

According to an exemplary embodiment of the invention, a backlight assembly includes a lens, a substrate, a light source and a bottom plate. A lens includes an upper flat surface having a first outer diameter, a bottom surface having a second outer diameter and a third inner diameter, an external curved surface which connects the upper flat surface and the bottom surface, an inner curved surface which protrudes toward the upper flat surface from the bottom surface at the third inner diameter, and two lens combining parts. The substrate has a width which is smaller than a distance between the lens combining parts. The light source is on the substrate and generates light. The bottom plate includes a bottom combining part which is combined with each of the lens combining parts. The substrate is between the lens and the bottom plate.

In an exemplary embodiment, the backlight assembly may further include a reflection sheet between the lens and the substrate.

According to an exemplary embodiment of the invention, a display apparatus include a liquid crystal display module, a light diffusion plate including a dot pattern on a surface thereof, and a backlight assembly. The backlight assembly includes a lens, a substrate, a light source and a bottom plate. The lens respectively overlaps the dot pattern of the light diffusion plate. The lens includes an upper flat surface having a first outer diameter, a bottom surface having a second outer diameter and a third inner diameter, an external curved surface which connects the upper flat surface and the bottom surface, an inner curved surface which protrudes toward the upper flat surface from the bottom surface at the third inner diameter, and two lens combining parts. The substrate has a width which is smaller than a distance between the lens combining parts. The light source is on the substrate and generates light. The bottom plate includes a bottom combining part which is combined with each of the lens combining parts. The substrate is between the lens and the bottom plate.

In an exemplary embodiment, the dot pattern includes a plurality of dots, and a distance between adjacent dots may be about 1 millimeter (mm) to about 1.5 millimeters (mm).

In an exemplary embodiment, the dot pattern includes a plurality of dots, and a maximum distance between outer edges of the dots may be about 0.3 mm to 1.0 mm.

In an exemplary embodiment, the dot pattern includes a plurality of dots, and a distance between adjacent dots may decrease as a distance from a center of the dot pattern decreases.

In an exemplary embodiment, the dot pattern includes a plurality of dots, and a maximum distance between outer edges of the dots may gradually increase as a distance from a center of the dot pattern decreases.

In an exemplary embodiment, the dot pattern may be on the surface of the diffusion plate by printing an ink with about 50 percent titanium dioxide ($TiO_2$), on the surface of the diffusion plate.

According to one or more exemplary embodiments of the invention, since lights refracted by a lens are distributed more uniformly and widely, a backlight assembly can include fewer light sources.

In addition, since use of a printed circuit board ("PCB") substrate is reduced by using a strip-shaped substrate, high material costs of the PCB substrate are saved, and the overall manufacturing cost of the backlight assembly and/or the display apparatus including the backlight assembly, is reduced.

In addition, since a dot pattern of a diffusion plate disperses light more uniformly, a bright spot and a dark spot caused by irregular light distribution are reduced or effectively prevented.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE INVENTION

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
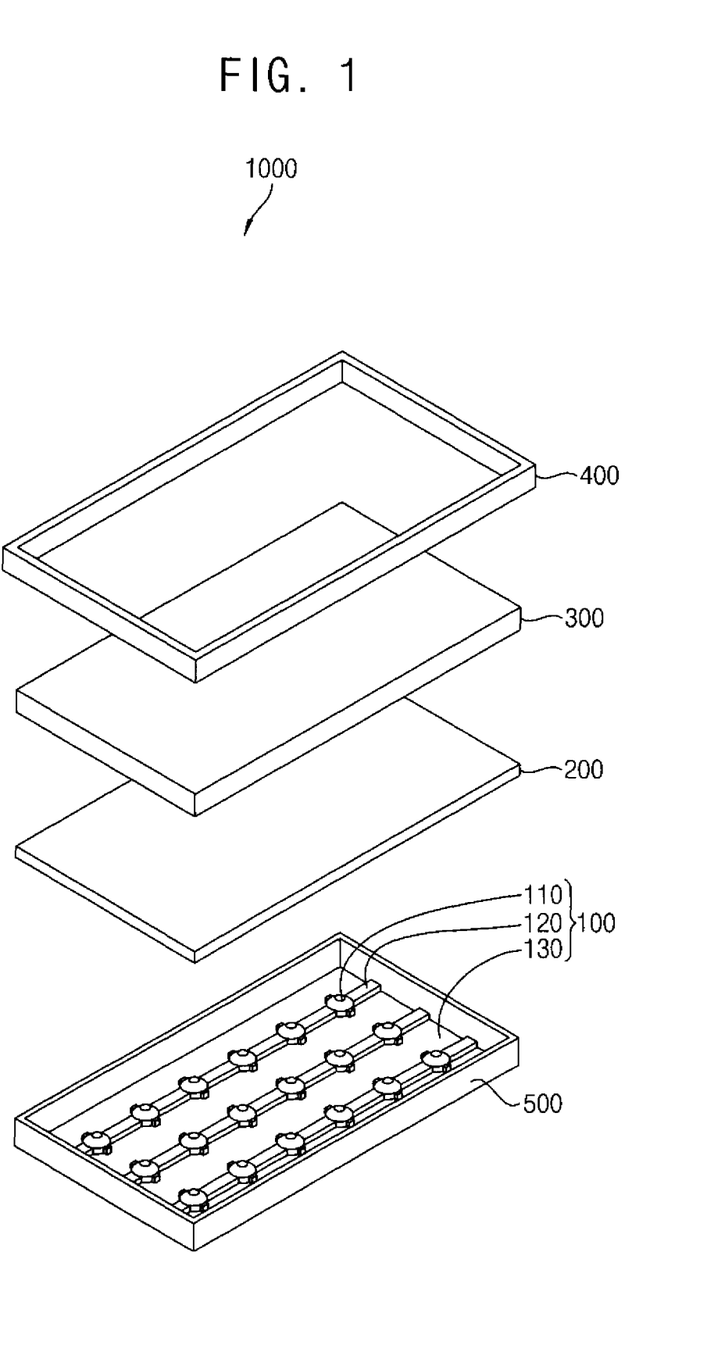
FIG. 1 is an exploded perspective view illustrating an exemplary embodiment of a display apparatus in accordance with the invention.

FIG. 1 is an exploded perspective view illustrating an exemplary embodiment of a display apparatus in accordance with the invention.

Referring to FIG. 1, a display apparatus 1000 includes a top plate 400, a liquid crystal display ("LCD") module 300, a diffusion plate 200 and a backlight assembly 100. The top plate 400 is combined with the backlight assembly 100 to receive the LCD module 300 and the diffusion plate 200. The LCD module 300 displays images according a signal and uses light generated by the backlight assembly 100 for displaying the images. The diffusion plate 200 diffuses the light generated by the backlight assembly 100 for more uniform distribution of the light, and provides the substantially uniform light to the LCD module 300.

The backlight assembly 100 includes a plurality of lenses 110, a substrate 120 including a plurality of point light sources (not shown), and a bottom plate 130. A plurality of substrates 120 may be disposed on the bottom plate 130 and arranged substantially parallel to each other, but the invention is not limited thereto. The light generated at the plurality of point light sources mounted on the substrate 120 passes through the plurality of lenses 110 and is emitted toward the LCD module 300. The plurality of lenses 110 disperses the light generated by the plurality of point light sources to cover an area greater than an emission area of the point light sources. Thus, due to the lenses dispersing the light, the light is provided into the LCD module 300 with fewer point light sources. When higher brightness is needed, the point light sources emitting light at higher brightness may be used, without increasing a number of the point light sources.

The backlight assembly 100 may further include a bottom frame 500 which receives the bottom plate 130, substrate 120 and lenses 110. The bottom frame 500 may include a bottom portion overlapping a portion of a rear surface of the bottom plate 130 and/or sidewalls extended towards the LCD module 300 from the bottom portion.

Figure 2:
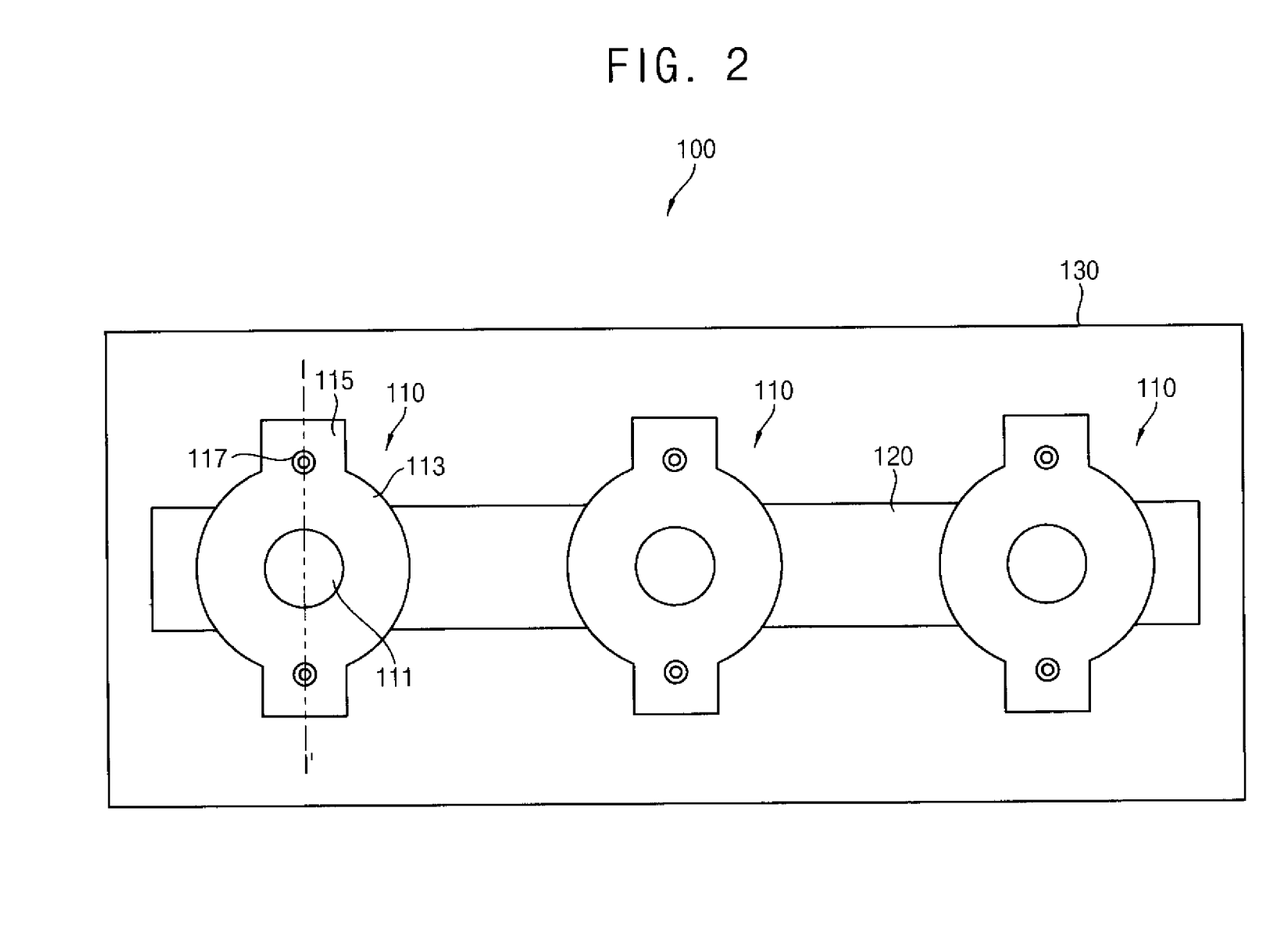
FIG. 2 is a plan view illustrating an exemplary embodiment of a backlight assembly of the display apparatus in FIG. 1.

FIG. 2 is a plan view illustrating an exemplary embodiment of a backlight assembly of the display apparatus in FIG. 1.

Referring to FIG. 2, the backlight assembly 100 includes the plurality of lenses 110, the substrate 120 includes the plurality of point light sources (not shown), and the bottom plate 130. The plurality of lenses 110 is disposed according to the plurality of light sources on the substrate 120. The plurality of lenses 110 disperses the light generated at the point light sources. Each of the lenses 110 includes two or more lens combining parts 115. The combining parts 115 are combined with the bottom plate 130.

The substrate 120 is disposed between the bottom plate 130 and the lens 110. The substrate 120 is fastened to the bottom plate 130 solely by combining the lenses 110 with the bottom plate 130.

In the plan view, the substrate 120 includes a longitudinal axis (horizontal in FIG. 2) extended in a first direction, and a transverse axis (vertical in FIG. 2) extended in a second direction which is perpendicular to the first direction. A width of the substrate 120 in the second direction is smaller than a width in the second direction between distal ends of the lens combining parts 115 of the lens 110. The substrate 120 is fastened to the bottom plate 130 solely by combining the lens combining parts 115 of the lens 110 with the bottom plate 130. Thus, the substrate 120 does not cover (e.g., overlap) an entire of the bottom plate 130. The substrate 120 may otherwise be referred to as strip-shaped, since the substrate 120 is a narrow member, comparatively long and has the width being substantially uniform. Since the substrate 120 does not overlap an entire of the bottom plate 130, a size of the substrate 120 is reduced. Generally, the costs for materials of the substrate 120 are very high. When the strip-shaped substrate 120 is used and fastened at the bottom plate 130 solely by combining the lens 110 with the bottom plate 130, the backlight assembly 120 is manufactured with less materials of the substrate 120. Thus, an overall manufacturing cost of the backlight assembly 100 and the display apparatus 1000 may be reduced.

Figure 3:
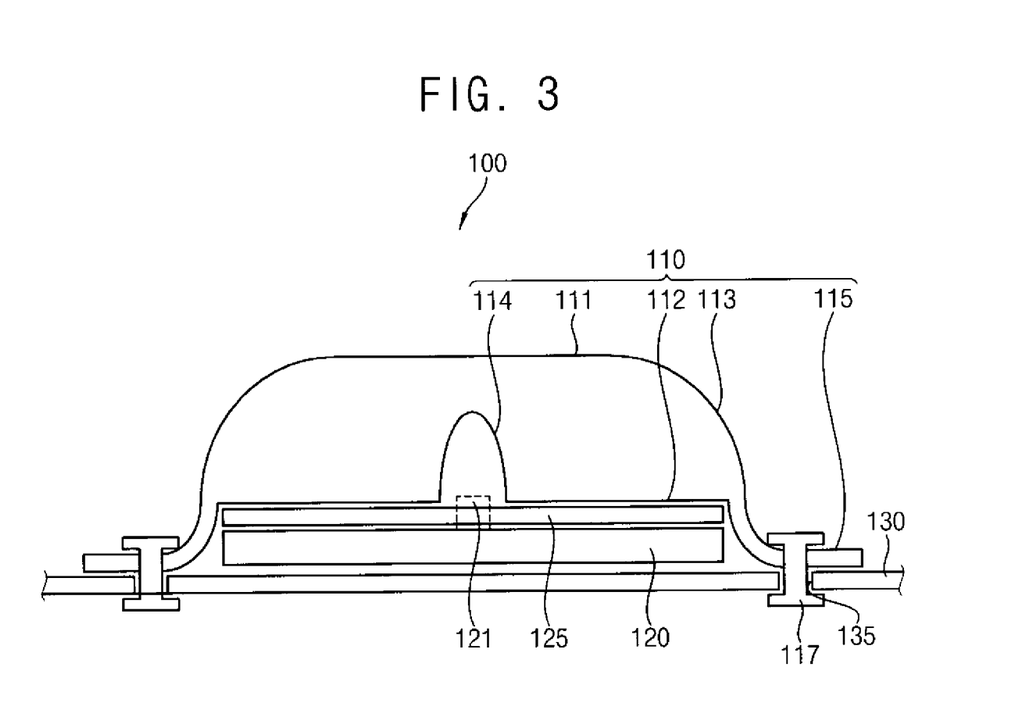
FIG. 3 is a cross-sectional view of the backlight assembly taken along line I-I' in FIG. 2.

FIG. 3 is a cross-sectional view of the backlight assembly taken along line I-I' in FIG. 2.

Referring to FIG. 2 and FIG. 3, the exemplary embodiment of the backlight assembly 100 includes the lens 110, the substrate 120 under the lens 110, and the bottom plate 130. More particularly, the lens 110 includes an upper flat surface 111, a bottom surface 112, an external curved surface 113 and an inner curved surface 114. The upper flat surface 111 is substantially planar, and incident light from a bottom of the lens 110 is totally refracted at the upper flat surface 111. The external curved surface 113 connects the upper flat surface 111 with the bottom surface 112. The inner curved surface 114 is connected with an inner surface of the bottom surface 112 and receives the incident light.

The lens 110 may further include two or more of the lens combining parts 115. The lens combining part 115 may include an enclosed opening 116 which extends completely through a thickness of the lens combining part 115, such that the lens combining part 115 solely defines the enclosed opening 116. Each lens combining part 115 may be combined with the bottom plate 130 through a fastening member 117.

The bottom plate 130 includes a bottom combining part 135. The bottom combining part 135 is aligned with the opening 116 of the lens combining part 115, such that the bottom plate 130 and the lens 110 may be fastened to each other with various methods. The bottom combining part 135 may include a hole or enclosed opening, solely defined by the bottom plate 130. In an exemplary embodiment, the fastening member 117 may be a combining screw, and may be various combining structures for easier assembly of the lens 110 to the bottom plate 130. In another exemplary embodiment, the lens combining part 115 may exclude the opening 116 and instead include a fastening member. The lens 110 is a single, unitary, indivisible member which includes the lens combining part 115.

The light source 121 is mounted on the substrate 120. The light source 121 may be a light emitting diode ("LED"). The light source 121 is a point light source, receives an electric power from the substrate 120 and is controlled by the substrate 120. The light source 121 is disposed inside the inner curved surface 114 of the lens 110. The light generated by the light source 121 enters the lens 110 through the inner curved surface 114.

A reflective sheet 125 may be between the substrate 120 and the lens 110. The reflective sheet 125 reflects the light, which is refracted by the lens 110, upwardly and improves the light's effectiveness. The reflective sheet 125 is disposed on the substrate 120 and includes an opening, through which the light source 121 protrudes into the lens 110. The reflective sheet 125 is fastened between the lens 110 and the bottom plate 130 solely by combining the lens combining part 115 of the lens 110 with the bottom plate 130.

Figure 4:
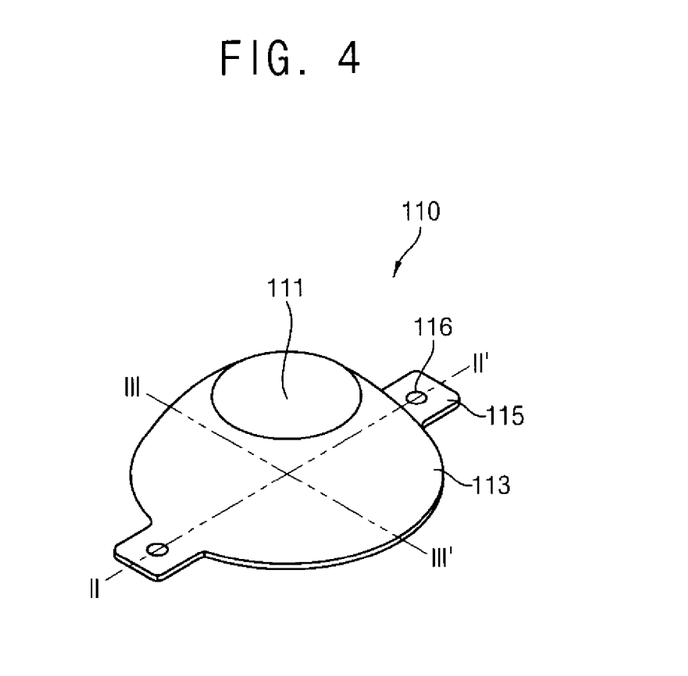
FIG. 4 is a perspective view illustrating an exemplary embodiment of a lens of the backlight assembly in FIG. 2.
Figure 5:
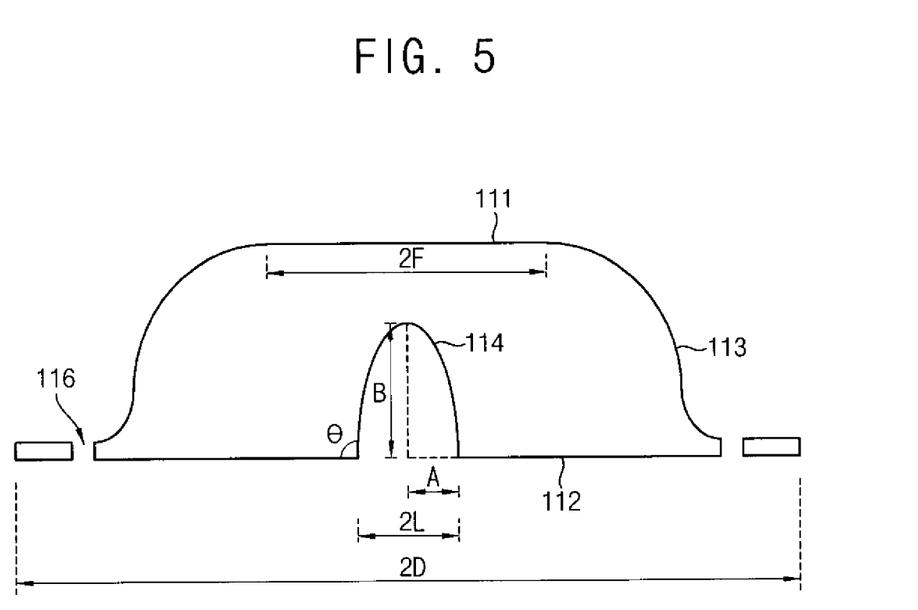
FIG. 5 is a cross-sectional view of the lens taken along line II-II' in FIG. 4.

FIG. 4 is a perspective view illustrating an exemplary embodiment of a lens of the backlight assembly in FIG. 2. FIG. 5 is a cross-sectional view of the lens taken along line II-II' in FIG. 4.

Referring to FIG. 4 and FIG. 5, the lens 110 includes an upper flat surface 111, a bottom surface 112, an external curved surface 113 and an inner curved surface 114. Moreover, the lens 110 includes two or more lens combining parts 115.

In a plan view, the upper flat surface 111 has a circular shape having a first outer diameter 2F. The upper flat surface 111 increase the ratio for totally refracting the incident light from the bottom of the lens 110, and improves the uniformity of the distribution of the light. In a plan view, the bottom surface 112 is ring-shaped including a second outer diameter 2D and a third inner diameter 2L. The bottom surface 112 having the second outer diameter 2D is connected with the external curved surface 113, and the external curved surface 113 is connected with the upper flat surface 111. The external curved surface 113 is effectively a side surface of the lens 110.

The graduation of the diameter of the external curved surface 113 in the plan view is adjusted so that the light emitted from the external curved surface 113 has light orientation angle distribution of about 65 degrees to about 75 degrees. The light orientation angle distribution is defined generally as angle ranges where intensity of the light is more than the half of the maximum intensity. The light emitted from the external curved surface 113 has light orientation angle distribution where the intensity of the light of the lens 110 is more than the half of the maximum intensity at the points of about 65 degrees to about 75 degrees.

Moreover, the external curved surface 113 is formed so that the light emitted from the external curved surface 113 have an intensity band width with less than about 20 degrees. Moreover, the light emitted from the external curved surface 113 may be adjusted so that a ratio of center intensity to peak intensity is about 0.15. The center intensity is defined as the intensity of the light emitted in a normal direction to the center point of the lens 110. The peak intensity is defined as the intensity at the maximum light intensity at the side surface of the lens 110. When the diameter of the external curved surface 113 is adjusted so that the ratio of the center intensity to the peak intensity is about 0.15, the light emitted from the lens 110 may be more uniformly distributed.

The bottom surface 112 is continuously connected at the third inner diameter 2L with the inner curved surface 114, and the inner curved surface 114 forms an entry part of the lens 110 through which the light enters the lens 110. The second outer diameter 2D of the bottom surface 112 may be about five to seven times the first outer diameter 2F of the upper flat surface 111. Moreover, the second outer diameter 2D of the bottom surface 112 may be about six times the first outer diameter 2F of the upper flat surface 111. The ratio of the first outer diameter 2F of the upper flat surface 111 to the second outer diameter 2D of the bottom surface 112 is used for adjusting the range where the light is totally refracted by the lens.

The inner curved surface 114 has a half-ellipse shape in a cross-sectional view taken along a vertical (e.g., perpendicular) direction with respect to the upper flat surface 111. At the half-ellipse shape of the inner curved surface 114, when a distance B is defined as a maximum length of the half-ellipse shape taken perpendicular to the bottom surface 112, and a distance A is defined as half a maximum distance of the half-ellipse shape taken parallel to the bottom surface 112, a ratio of the diameter B to the diameter A may be about 1.5 to about 2.0. Moreover, the first outer diameter 2F may be more than two times the diameter A. Moreover, an angle θ where the inner curved surface 114 and the bottom surface 112 meet may be about 105 degrees to about 115 degrees. The angle θ where the inner curved surface 114 and the bottom surface 112 meet adjusts a refracted angle at which the light from the light sources is initially refracted at the inner curved surface 114.

The bottom surface 112 may include embossed pattern (not shown). When the totally refracted light at the upper flat surface 111 is reflected at the bottom surface 112, the embossed pattern disperses the light. The embossed pattern may have a roughness of less than about 4 micrometers. When the embossed pattern has a roughness greater than about 4 micrometers, totally refracted light at the upper flat surface 111 dispersed at the bottom surface 112 has an irregular reflection and the light distribution may be irregular. The roughness within the designated range of less than about 4 micrometers induces the uniform light distribution.

Figure 6:
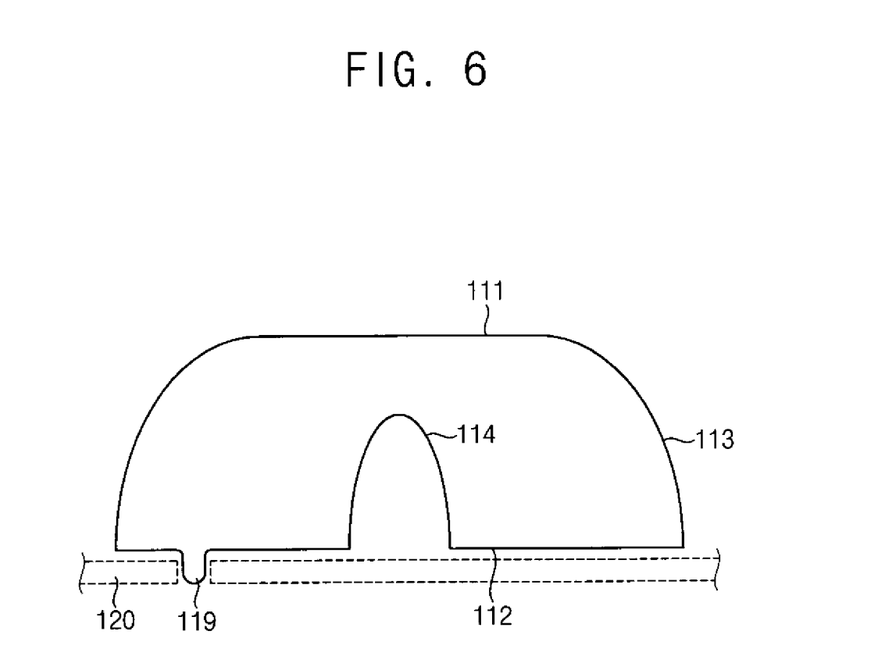
FIG. 6 is a cross-sectional view of the lens taken along line III-III' in FIG. 4.

FIG. 6 is a cross-sectional view of the lens taken along line III-III' in FIG. 4.

Referring to FIG. 6, the lens 110 may further include an alignment protrusion 119. The substrate 120 may further include an alignment recess which extends from an upper surface of the substrate 120 toward an inner area thereof. The alignment recess may extend partially or completely through a thickness of the substrate 120. The alignment protrusion 119 protrudes into the alignment recess, is combined with the substrate 120, and aligns the lens 110 in a proper position within the backlight assembly 100. The lens 110 is fastened by the two or more the lens combining parts 115 and the alignment protrusion 119. Since the lens 110 is fastened by at least three points, the lens 110 can be fastened at the proper position within the backlight assembly 100. Moreover, since the lens 110 includes only a single one alignment protrusion 119, leaking of the light is reduced or effectively prevented as compared to the lens 110 including two or more alignment protrusions.

Figure 7:
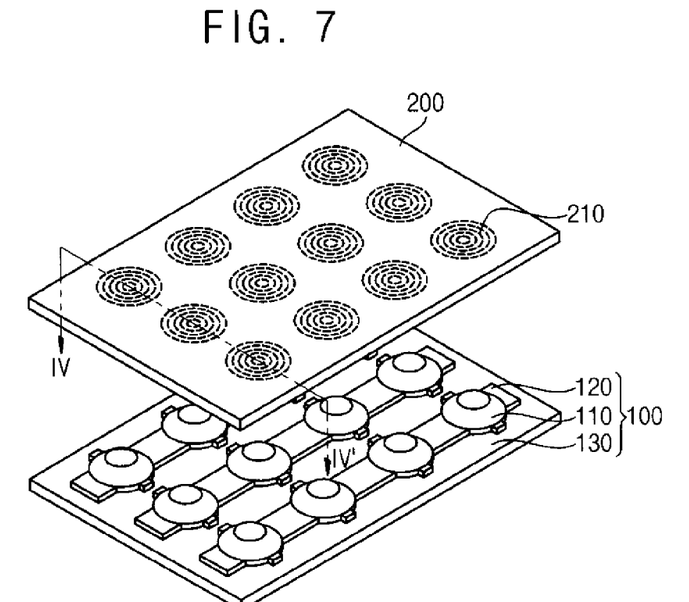
FIG. 7 is a perspective view illustrating an exemplary embodiment of a backlight assembly and a diffusion plate in FIG. 1.
Figure 8:
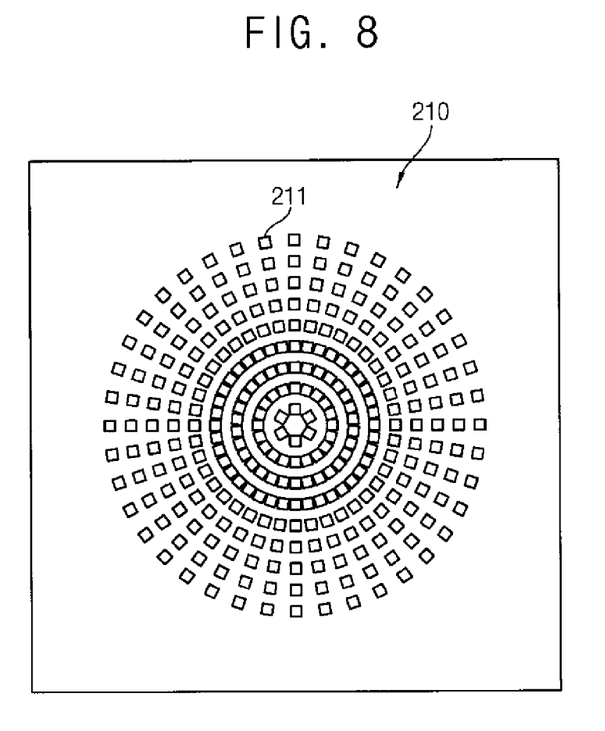
FIG. 8 is a plan view illustrating an exemplary embodiment of a dot pattern of the diffusion plate in FIG. 7.

FIG. 7 is a perspective view illustrating an exemplary embodiment of a backlight assembly and a diffusion plate in FIG. 1. FIG. 8 is a plan view illustrating an exemplary embodiment of a dot pattern of the diffusion plate in FIG. 7.

Referring to FIG. 7 and FIG. 8, the diffusion plate 200 is disposed on and overlapping the backlight assembly 100. The diffusion plate 200 includes a plurality of dot patterns 210. The plurality of dot patterns 210 is disposed according to the lens 110 of the backlight assembly 100, that is, one dot pattern 210 overlaps at least one lens 110 of the backlight assembly 100. The dot pattern 210 diffuses the light emitted from the lens 110. The dot patterns 210 may be formed by printing patterns on the diffusion plate 200. In one exemplary embodiment, an ink with about 50% $TiO_2$ might be used in printing the dot patterns 210.

Each dot pattern 210 includes a plurality of protrusions, otherwise referred to as dot particles 211. In a plan view, the overall shape of the dot patterns 210 defined by the dot particles 211, may be a circle or a rectangular, but the invention is not limited thereto or thereby. In the plan view, a distance between adjacent dot particles 211, otherwise referred to as a dot pitch of the dot patterns 210, may be about 1 millimeter (mm) to about 1.5 millimeters (mm). Moreover, a maximum distance between outer edges of the dot particles 211, otherwise referred to as a dot diameter of the dot patterns 210, may be about 0.3 mm to about 1.0 mm.

Since the light provided to the dot pattern 210 is denser at a center of the dot pattern 210, the distribution of the dot particles 211 may be denser at the center of the dot pattern 210. To achieve a higher density of the dot particles 211 at the center of the dot pattern 210, a density of the dot particles 211 may be increased at the center of the dot pattern 211, or dimensions of the dot particles 211 may be gradually increased as a distance to the center of the dot pattern 210 decreases. The distribution of the dot particles 211 according to the distance from the center of the dot pattern 210 may disperse the light uniformly.

Figure 9:
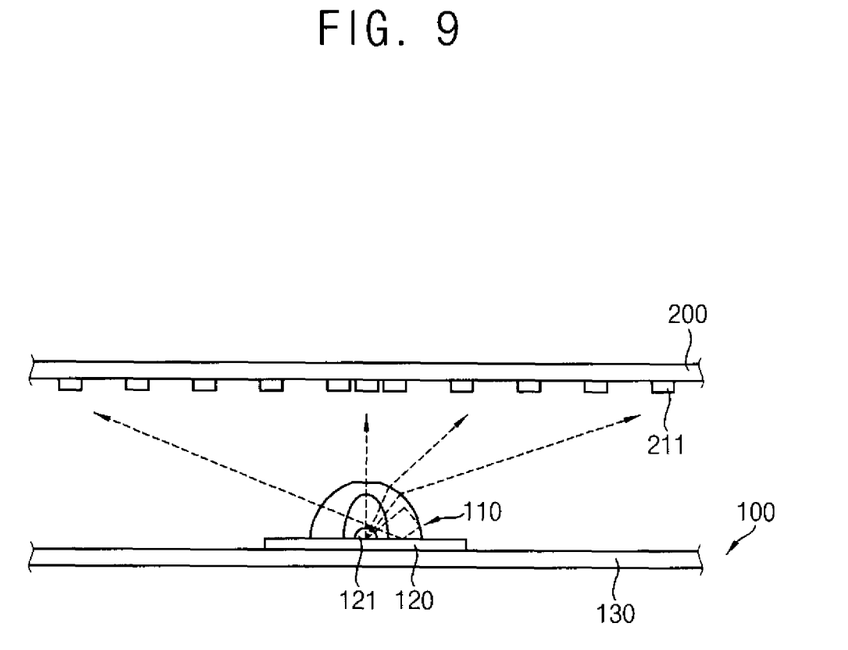
FIG. 9 is a cross-sectional view of the backlight assembly and the diffusion plate taken along line IV-IV' in FIG. 7.

FIG. 9 is a cross-sectional view of the backlight assembly and the diffusion plate taken along line IV-IV' in FIG. 7.

Referring to FIG. 9, the exemplary embodiment of the lens 110 of the backlight assembly 100 is disposed corresponding to the dot pattern 210 of the diffusion plate 200, such as in one-to-one correspondence. The dot pattern 210 is disposed above and overlapping the lens 110 of the backlight assembly 100, in the plan view. The light emitted from a center top of the lens 110 moves towards a center of the dot pattern 210. At the center of the dot pattern 210, the dot particles 211 are disposed in a higher density than at a peripheral area of the dot pattern 210. Sizes of the dot particles 211 in the plan view are uniform as illustrated in the embodiment of FIG. 8, and sizes of the dot particles 211 in the cross-sectional view are uniform as illustrated in the embodiment in FIG. 9. However, the invention is not limited thereto or thereby, and the sizes of the dot particles 211 may be changed to adjust the dispersion of the light.

As mentioned above, according to one or more exemplary embodiments of the invention, since lights refracted by a lens are distributed more uniformly and widely, and a backlight assembly can include fewer light sources.

In addition, since use of a printed circuit board ("PCB") substrate is reduced by using a strip-shaped substrate, high material costs of the PCB substrate are saved, and the overall manufacturing cost of the backlight assembly and/or the display apparatus including the backlight assembly, is reduced.

In addition, since a dot pattern of a diffusion plate disperses light more uniformly, a bright spot and a dark spot caused by irregular light distribution are reduced or effectively prevented.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A lens comprising:
    an upper flat surface having a first outer diameter;
    a ring-shaped bottom surface having a second outer diameter and a third inner diameter;
    an external curved surface which connects the upper flat surface and the bottom surface; and
    an inner curved surface which protrudes toward the upper flat surface from the bottom surface, at the third inner diameter,
    wherein the first outer diameter of the upper flat surface is more than two times the third inner diameter of the bottom surface.

2. The lens of claim 1,
    wherein the second outer diameter is about six times the first outer diameter.

3. The lens of claim 1,
    wherein the inner curved surface comprises a half-ellipse shape in a cross-sectional view taken perpendicular to the upper flat surface.

4. The lens of claim 3,
    wherein a ratio of a diameter B to a diameter A of the inner curved surface is about 1.5 to about 2.0,
    when the diameter A is half a maximum length of the half-ellipse shape taken parallel to the upper flat surface, and the diameter B is a maximum length of the half-ellipse shape taken perpendicular to the upper flat surface, in the cross-sectional view.

5. The lens of claim 1,
    wherein an angle between the bottom surface and the inner curved surface is about 105 degrees to about 115 degrees.

6. The lens of claim 1,
    wherein the bottom surface comprises an embossed pattern having a roughness less than about 4 micrometers.

7. The lens of claim 1, further comprising an alignment protrusion which protrudes from the bottom surface and away from the upper flat surface.

8. The lens of claim 1, further comprising two lens combining parts which are extended from a side of the lens where the bottom surface and the external curved surface meet.

9. The lens of claim 1,
    wherein a light which is emitted from the external curved surface has a light orientation angle distribution of about 65 degrees to about 75 degrees.

10. The lens of claim 1,
    wherein a light which is emitted from the external curved surface has an intensity band width of less than about 20 degrees.

11. The lens of claim 1,
    wherein a ratio of a center intensity to a peak intensity of a light which is emitted from the external curved surface is about 0.15.

12. A backlight assembly comprising:
    a lens comprising:
        an upper flat surface having a first outer diameter,
        a bottom surface having a second outer diameter and a third inner diameter,
        an external curved surface which connects the upper flat surface and the bottom surface,
        an inner curved surface which protrudes toward the upper flat surface from the bottom surface, at the third inner diameter, and
        two lens combining parts;
    an elongated substrate having, in a top plan view, a width which is smaller than a distance between the lens combining parts and a length which extends further than outer edges of the external curved surface to be exposed outside the external curved surface;
    a light source on the substrate, wherein the light source generates light; and a bottom plate comprising a bottom combining part which is combined with each of the lens combining parts, wherein the substrate is between the lens and the bottom plate.

13. The backlight assembly of claim 12, further comprising a reflection sheet between the lens and the substrate.

14. A display apparatus comprising:
a liquid crystal display module;
a light diffusion plate comprising a dot pattern on a surface of the light diffusion plate; and
a backlight assembly comprising:
 a lens which respectively overlaps the dot pattern of the light diffusion plate, the lens comprising:
  an upper flat surface having a first outer diameter,
  a bottom surface having a second outer diameter and a third inner diameter,
  an external curved surface which connects the upper flat surface and the bottom surface,
  an inner curved surface which protrudes toward the upper flat surface from the bottom surface, at the third inner diameter, and
  two lens combining parts;
 an elongated substrate, in a top plan view, having a width which is smaller than a distance between the lens combining parts and a length which extends further than outer edges of the external curved surface to be exposed outside the external curved surface;
 a light source on the substrate, wherein the light source generates light; and
 a bottom plate comprising a bottom combining part which is combined with each of the lens combining parts, wherein the substrate is between the lens and the bottom plate.

15. The display apparatus of claim 14,
wherein the dot pattern comprises a plurality of dots, and a distance between adjacent dots is about 1 millimeter to about 1.5 millimeters.

16. The display apparatus of claim 14,
wherein the dot pattern comprises a plurality of dots, and a maximum distance between outer edges of the dots is about 0.3 millimeter to about 1.0 millimeter.

17. The display apparatus of claim 14,
wherein the dot pattern comprises a plurality of dots, and a distance between adjacent dots decreases as a distance from a center of the dot pattern decreases.

18. The display apparatus of claim 14,
wherein the dot pattern comprises a plurality of dots, and a maximum distance between outer edges of the dots gradually increases as a distance from a center of the dot pattern decreases.

19. The display apparatus of claim 14,
wherein the dot pattern is on the surface of the diffusion plate by printing an ink including about 50 percent of titanium dioxide ($TiO_2$), on the surface of the diffusion plate.

* * * * *